Dec. 18, 1951 F. NETTEL Re. 23,444

SUPERCHARGED INTERNAL-COMBUSTION ENGINE WITH STARTING MEANS AND METHOD FOR STARTING SAME

Original Filed April 5, 1948

INVENTOR:

Frederick Nettel

By:

Bertram Ottinger

ATTORNEY

Reissued Dec. 18, 1951 Re. 23,444

UNITED STATES PATENT OFFICE 23,444

SUPERCHARGED INTERNAL-COMBUSTION ENGINE WITH STARTING MEANS AND METHOD FOR STARTING SAME

Frederick Nettel, Manhasset, N. Y.

Original No. 2,503,289, dated April 11, 1950, Serial No. 18,995, April 5, 1948. Application for reissue April 9, 1951, Serial No. 220,004

27 Claims. (Cl. 290—4)

Figure 1:
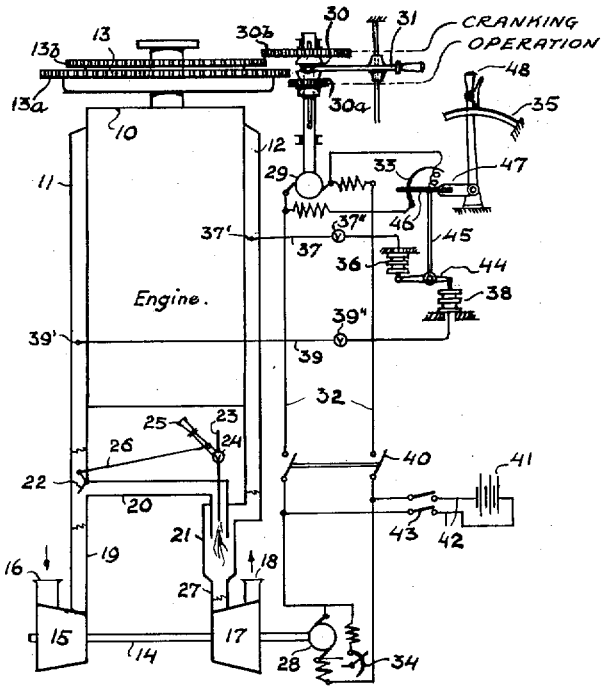

Matter enclosed in heavy brackets [ ] appears in the original patent but forms no part of this reissue specification; matter printed in italics indicates the additions made by reissue.

This invention relates to supercharged internal combustion engines. More particularly, the invention pertains to the construction and operation of power plants comprising supercharged internal combustion engines employing exhaust gas driven charging blowers mechanically independent of the charged engines.

For efficient supercharging of internal combustion engines, it is desirable in four-stroke cycle engines, and necessary in two-stroke cycle engines, to maintain a positive pressure differential between the charging air and the exhaust gases leaving the engine cylinders.

Present day constant pressure turbochargers will achieve such a pressure differential only when the gas temperature at the turbine inlet is above the so-called "bootstrap" temperature, i. e. under conditions when the turbocharger can function as a self-power-supporting unit with an auxiliary combustion chamber between the blower and the turbine section of the turbocharger.

It is well known that a conventional turbocharger set by itself cannot be used in conjunction with a two-stroke cycle engine, principally because engines of this type need a positive pressure differential over their entire working ranges. Without such a differential, operation is impossible because no new air charge can enter the cylinders, and exhaust gas temperatures become too low at low engine loads to maintain such positive differential.

To offset this difficulty it has been proposed mechanically to couple the blower to the engine shaft. For centrifugal or axial flow blowers this mode of operation requires gear trains of large ratios, and for positive displacement blowers, gear trains of lower ratios. With piston blowers, an extra linkage is heeded. For special purposes it also has been proposed to use variable gear ratio transmissions, hydraulic or electric transmissions between the engine shaft and the blower.

All of these coupling means regardless of their type, were used heretofore solely to transmit power from the engine shaft to the blower, and for this single purpose represented disproportionate complications which added considerably to the size, weight and complexity of operation and maintenance of the plant. While starting of engines embodying such coupling means of fixed ratio, such as have been employed most frequently, can be effected, albeit with difficulty in the case of highly supercharged engines, special provision must be made for cranking the engine and blower.

It is an object of this invention to use the same means which serves to crank and start the engine, for influening the operating condition of the supercharging blower over the whole working range of the engine, causing it to aid in furnishing the desired or necessary positive pressure differential without substantially complicating the plant and adding to its weight.

Other objects and advantages of the invention will be apparent from the following description and illustration of the invention by way of nonlimiting examples.

In the accompanying drawings, in which are shown various possible embodiments of the invention.

Fig. 1 shows an engine with an independent turbocharger set and an auxiliary combustion chamber which may be used for operating the turbocharger independently of the engine as a power self-supporting gas turbine plant. The turbocharger set is provided with a dynamo which can produce energy which may be transmitted electrically to the engine cranking motor. Means is provided to reverse the energy flow in this electric transmission in such manner that the cranking motor, working as a dynamo, and driven by the engine, can supply energy to the dynamo coupled with the turbocharger, in which case the latter dynamo functions as a motor.

Figure 2:
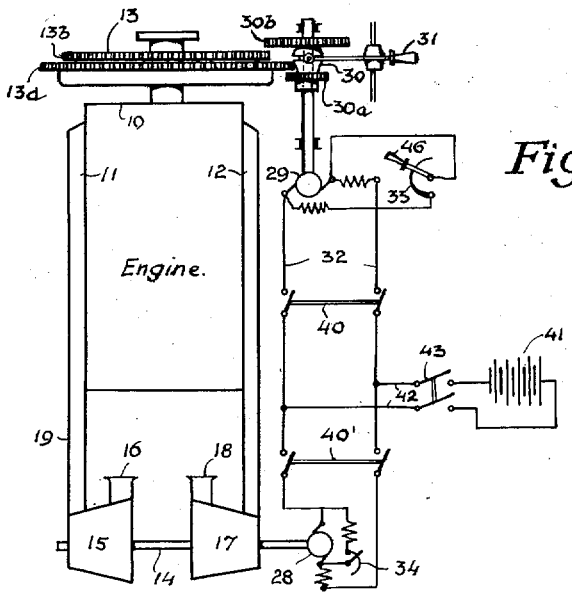

Fig. 2 illustrates an engine plant in which the engine and the turbocharger may be started from a storage battery, while during engine operation the engine cranking motor, operating as dynamo, assists in driving the charging blower.

Figure 3:
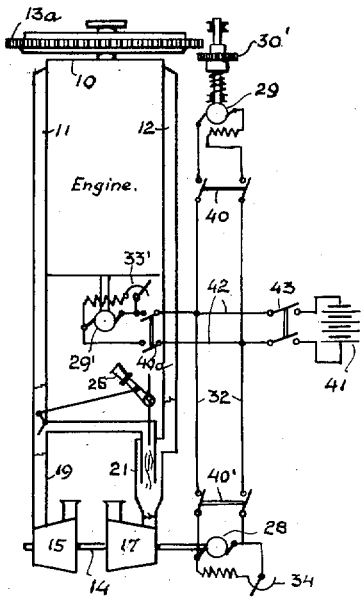

Fig. 3 indicates diagrammatically a modification of the plant shown in Fig. 1, but with a conventional electric starter motor and a separate dynamo coupled to the engine to feed energy back to the charging blower.

Referring now in detail to Fig. 1, the reference numeral 10 denotes an engine of the two-stroke or four-stroke cycle type having an air intake manifold 11, an exhaust gas manifold 12, and a flywheel with a double spur gear rim 13a, 13b. A turbocharger set 14 is provided, consisting of a scavenging or charging blower 15 with an air intake 16, and an exhaust gas turbine 17 with a gas outlet 18. The air discharge pipe 19 of the blower is connected to the intake manifold 11. The exhaust manifold 12 is connected to an auxiliary combustion chamber 21 and thence by a pipe 27 to the turbine 17. A branch pipe 20 connects the pipe 19 with the combustion chamber 21, the flow of branched air being governed by a flap valve 22. A fuel pipe 23 with a valve 24 operable by a handlever 25 furnishes a regulatable flow of fuel to the auxiliary combustion chamber. A rod 26 links the flap valve 22 and fuel valve 24.

A motor-dynamo 29 with a shuntfield regulator 33 is coupled to the engine shaft via a selective two-speed gear set 30, either by the large gear rim 13a of the flywheel 13 meshing with the pinion 30a (high ratio) or by the smaller gear rim 13b meshing with the gear wheel 30b (low ratio).

The gear set 30 is operated by a shift lever 31. Another motor-dynamo 28 with a shuntfield regulator 34 is connected electrically to the motor-dynamo 29 by cables 32 and a switch 40. This second motor-dynamo is connected physically to the turbocharger shaft. An auxiliary battery 41 is connected electrically by wires 42 and a switch 43 to the cables 42 on the side of the switch 40 connected to the second motor-dynamo 28.

A pair of elastic bellows 36, 38 are provided, one of the bellows, e. g. the bellows 36 being connected by a tube 37 to an inlet opening 37' in the exhaust manifold 12. The other bellows 38 is connected by a tube 39 to an inlet opening 39' in the engine air intake manifold 11. The two bellows are pivotally connected to opposite ends of a floating rod 44 in such fashion that they act in opposite directions, as shown in Fig. 1. A rod 45 is pivotally attached at one end to the rod 44 intermediate the points of connection of the bellows. The other end of the rod 45 is pivotally attached to the operating arm 46 of the regulator 33. Said arm pivots at a fulcrum point 47 which is rotatably secured to the short arm of a bell crank lever 48 whereby movement of the other manually operable arm of the lever 48 will effect regulation of the motor-dynamo 29. Said latter arm frictionally slides on a fixed member 35 so as to retain the bell crank lever in any adjusted position thereof.

The plant is started and operated as follows:

Switch 40 is opened and switch 43 closed. Regulator 34 is operated to energize the motor-dynamo 28 as motor, thereby speeding up the turbocharger set 14 until a slight air flow is created through the combustion chamber 21. Now the hand lever 25 is moved to the right, as viewed in Fig. 1, opening flap 22 towards the branch pipe 20 and opening the fuel valve 24, thus admitting fuel which is ignited. The turbine 17 begins to develop power and takes over the drive of the blower 15 from motor-dynamo 28 which may be switched off by opening switch 43. The turbocharger set thereupon operates as an independent gas turbine plant, its speed, the pressure developed by blower 15, and the power produced depending only on the fuel quantity fed into the combustion chamber.

Next, lever 31 is moved upwards into "cranking" position (see Fig. 1 shown by the upper dotted position), thus causing the gear rim 13a to mesh with the pinion 30a. Now the motor-dynamo 29 is regulated to operate as a motor, while the motor-dynamo 28, which is running, is regulated to operate as a generator. Thereupon switch 40 is closed, enabling the motor-dynamo 28 to transmit energy produced by the operating turbocharger set to the motor-dynamo 29 for cranking. After starting the engine, shift lever 31 is moved down to its "operating" position, when gear wheel 30b meshes with rim 13b.

With the engine running, its exhaust gases reach the turbine 17 and furnish the power to drive the blower 15 either partially or completely, so that the fuel to the combustion chamber either can be reduced or cut off by moving lever 25 to the left. If desired, the bellows 36 and 38 can be made inoperative during starting of the engine by closing the cocks 37'', 39'' provided in the tubes 37 and 39.

If we assume the engine 10 to be of the two-stroke cycle type, the turbocharger will continue to run, but will, as experiments have shown, under partial load conditions of the engine, not be capable of pumping sufficient air through the cylinders, due to the pressure produced by the blower not being sufficiently higher than the pressure prevailing in the exhaust manifold. Therefore, the engine may stop for lack of air. This invention prevents such stoppage by use of the low ratio gear train in the gear set 30, which causes the motor-dynamo 29, now regulated to operate as a generator, to be driven by the running engine, and be capable of transmitting energy provided by the engine to the motor-dynamo 28, regulated to operate as a motor.

According to this invention, the energy flow between the motor-dynamos 28, 29 may be controlled automatically in two- or four-stroke cycle engines by the bellows 36 and 38 acting via rods 44 and 45 on the regulator 33 in such fashion that sufficient power is produced by the motor-dynamo 28 to speed up the turbocharger set until the pressure in the intake manifold is, by a predetermined value, higher than the pressure in the exhaust manifold 12.

The hand lever 48 serves to regulate the supercharged condition of the engine irrespective of its speed, load or the temperature of the engine exhaust. If a higher supercharge is required, the lever 48 is moved to the right thereby lifting the right hand end of the arm 46 which turns round the point at which the rod 45 is connected to it. The active resistance of the regulator 33 thereby is reduced and the voltage across the terminals of the motor-dynamo 29, now working as generator, is increased. This in turn causes more energy to flow to the motor-dynamo 28, now operating as motor, increasing its speed and that of the blower which furnishes a higher supercharge pressure. By moving the lever 48 to the left, the opposite effect is achieved.

It is immaterial what particular designs are used for the motor-dynamos and their regulators, it being essential only for the purposes of this invention, that the energy flow through the connections between the two motor-dynamos is in the direction from the turbocharger to the cranking pinion 30a during starting of the engine, and in the opposite direction during the operation of the engine. Since the necessary energy flow can be maintained over the whole speed and/or load range of the engine, the scavenging air supply is assured, and satisfactory operation of two-stroke cycle engines is achieved.

This invention also can be applied to four-stroke cycle engines, in which case the scavenging can be materially improved at partial loads and speeds. Since this invention makes the degree of supercharge independent of the load and/or speed condition of any type of engine, it is possible to superimpose on the engine any desired speed-torque characteristic.

Fig. 2 illustrates a modification of my invention generally similar to that shown in Fig. 1 and differing therefrom principally in that no auxiliary combustion chamber is provided. In addition there is no automatic regulation shown. The arm 46 of the regulator 33 is used as hand lever in this case. Furthermore an extra switch 40' is included in the cables 32 between the motor-dynamo 28 and the point of connection of the cables 42 leading from the battery 41. All parts the same as those in Fig. 1 are denoted in Fig. 2 and Fig. 3 by the same numerals.

Starting and operation of a four-stroke cycle engine for example is as follows: First the engine 10 is cranked and started from the battery 41 with switches 40 and 43 closed, switch 40' open, and motor-dynamo 29 operating as a motor. The turbocharger set begins to operate by itself as soon as the engine is running. Then switch 43 is opened and the gear set 30 operated to drive the motor-dynamo 29 via the low gear train from the engine as a generator. When switch 40' is closed, the motor-dynamo 29 can drive the motor-dynamo 28, working as a motor, thus helping the turbine 17 to drive the blower 15. The regulator 33 can be operated by moving its arm 46 by hand, or automatically as shown in Fig. 1.

It is also within the scope of this invention to use the motor-dynamo 29 of both arrangements shown in Figs. 1 and 2, working as a generator, for quickly stopping the engine. In such case the inertia of the slowing engine is transmitted via motor-dynamo 29 to motor-dynamo 28, the latter working as motor, with the result that the speed of the turbocharger set will increase correspondingly. This is desirable for maneuvering in reversing drives, where the turbocharger set is used immediately after stopping the engine for cranking it in reverse.

It is finally within the scope of this invention to use instead of one motor-dynamo coupled via a two-ratio shift gear to the engine, two dynamo-electric machines, both mechanically coupled to the engine through suitable gears, or directly to the shaft. It is only essential for the purposes of this invention that during cranking of the engine, one or both these machines working as motor receive energy from the dynamo-electric machine driven by the blower set working as power producing gas turbine unit, and during operation of the engine one or both of the two first mentioned dynamo-electric machines operate as generator, energizing the dynamo-electric machine coupled to the blower set as motor, thus assisting in driving the blower. Such arrangement is diagrammatically illustrated in Fig. 3. The basic arrangement shown is the same as in Fig. 1. The main difference is in that another dynamo-electric machine 29' with regulator 33' is shown for example coupled to the engine shaft, and that both machines 29 and 29' are connectable to the machine 28 and to the battery 41 via two switches 40 and 40a. Starting and operation is in principle the same as described for Fig. 1 except that 29 is a conventional starting motor which is switched off by switch 40 and pinion 30' unmeshed automatically after the engine 10 has started firing; dynamo 29' with regulator 33' is disconnected during starting from the cables 32 by keeping the switch 40a open. During operation of the engine switch 40a is closed and the dynamo 29' used to drive the motor-dynamo 28 as motor.

It is immaterial for the purpose of this invention whether the engine employed works on the compression-ignition or spark-ignition principle, or what type of fuel is used in the engine or in the combustion chamber, e. g. liquid or gaseous.

I claim:

1. A method of starting and operating a power plant comprising an internal combustion engine having an exhaust gas turbine driven blower set for supplying combustion air to said engine, said set being mechanically independent of the engine shaft, motor-dynamo means mechanically coupled to said set, second motor-dynamo means mechanically coupled to the engine shaft, disconnectable electrical conduit means between said motor-dynamo means, a fuel burning combustion chamber disposed in the exhaust gas conduit to said turbine, and a regulatable branch conduit connecting the pressure side of said blower to said combustion chamber: said method comprising the steps of operating said turbine driven blower set by means of said combustion chamber as an independent gas turbine plant prior to starting the engine, producing by said gas turbine plant electrical energy in said first motor-dynamo means, transmitting it to the engine shaft by means of said second motor-dynamo means for cranking said engine for starting, continuing operation of said blower set as a turbocharger set for the engine, and reversing the energy flow between said two motor-dynamo means so that said second motor-dynamo means, operating as a generator, supplies energy to said first motor-dynamo means for driving it as a motor to assist said turbine in driving said blower.

2. In a method as set forth in claim 1, the step of regulating said reversed energy flow in such manner that the air pressure at the blower outlet is kept higher than the exhaust gas pressure in front of said turbine, irrespective of the operating condition of the engine.

3. In a method of starting and operating a power plant as set forth in claim 1, having a variable resistance regulator for the second motor-dynamo means, the step of actuating said regulator with said second motor-dynamo means operating as generator, for controlling the degree of supercharge of the engine independent of the speed and the exhaust gas temperature of the engine.

4. In a method of starting and operating a power plant as set forth in claim 1, employing a two-speed shift gear between the second motor-dynamo means and the engine shaft, the step of using the high gear ratio position during operation of said second motor-dynamo means as motor, and the low gear ratio position during its operation as a generator.

5. A method of starting and operating a power plant comprising an internal combustion engine of the four-stroke cycle type having an exhaust gas turbine driven blower set for supplying combustion air to said engine, said set being mechanically independent of the engine shaft, motor-dynamo means mechanically coupled to said set, motor-dynamo means mechanically coupled with the engine shaft, electrical conduit means between said motor-dynamo means, and a disconnectable external electric power source for starting purposes: said method comprising the steps of connecting said second motor-dynamo means, operating as motor, to said external power source and thereby cranking the engine, admitting fuel for starting the engine, and by its exhaust gases starting the turbocharger set, disconnecting said second motor-dynamo means from said power source, operating it as a generator driven by said engine, and connecting it to said first motor-dynamo means operating as motor for supplying power to assist said gas turbine in driving said blower for supercharging of the engine.

6. In a method of starting and operating a power plant comprising as set forth in claim 5, the step of regulating the power supply from the second motor-dynamo means operating as a generator for the first motor-dynamo means.

7. In a method of starting and operating a power plant as set forth in claim 5, having a variable resistance regulator for the second motor-dynamo means, the step of actuating said regulator with said second motor-dynamo means operating as generator, for controlling the degree of supercharge independent of the speed and the exhaust gas temperature of the engine.

8. In a method of starting and operating a power plant as set forth in claim 5, employing a two-speed shift gear between the second motor-dynamo means and the engine shaft, the step of using the high gear ratio position during operation of said motor-dynamo means as motor, and the low gear ratio position during its operation as a generator.

9. A method of starting and operating a power plant comprising an internal combustion engine [of the two-stroke cycle type] having an exhaust gas turbine driven blower set for supplying combustion air to said engine, said set being mechanically independent of the engine, an electric motor mechanically coupled to said set, a motor-dynamo mechanically coupled with the engine shaft, electrical conduit means between said electric machines, and a disconnectable external electric power source for starting purposes: said method comprising the steps of connecting said motor to said external power source for starting the turbocharger set, thereafter energizing said motor-dynamo operating as a motor from said power source and thereby cranking the engine, admitting fuel to the engine for starting it, disconnecting said power source from both the motor and the motor-dynamo, operating the latter as generator driven by the engine, and connecting it to said motor for supplying power to assist gas turbine in driving said blower for supercharging of the engine.

10. In a method, as set forth in claim 9, of starting and operating a power plant including an internal combustion engine [of the two-stroke cycle type], the step of regulating the power supply from the motor-dynamo operating as a generator to the motor.

11. In a method of starting and operating a power plant as set forth in claim 9, employing a two-speed shift gear between the motor-dynamo means and the engine shaft, the step of using the high gear ratio position during operation of said motor-dynamo means as motor, and the low gear ratio position during its operation as a generator.

12. In a method of starting and operating a power plant comprising an internal combustion engine having an exhaust gas turbine driven blower set for supplying combustion air to said engine, said set being mechanically independent of the engine shaft, motor-dynamo means mechanically coupled to said set, motor-dynamo means mechanically coupled to the engine shaft, and disconnectable electrical conduit means between said motor-dynamo means: those steps comprising operating said second motor-dynamo means as motor for cranking and starting said engine and, thereafter, operating it as a generator driven by said engine, for supplying power to said first motor-dynamo means for assisting said gas turbine in driving said blower for supercharging of the engine.

13. In a method of starting and operating a power plant as set forth in claim 12, employing a two-speed gear train between the second motor-dynamo means and the engine shaft, the step of using the high ratio gear train during operation of said second motor-dynamo means as a motor, and the low ratio gear train during its operation as a generator.

14. A power plant comprising an internal combustion engine, an exhaust gas turbine driven air blower set, conduit means connecting the blower exhaust to the engine air intake, conduit means connecting the engine exhaust to the turbine intake, a dynamo-electric machine coupled to said set, a motor-dynamo mechanically coupled to the engine shaft, electric conduit means interconnecting said two electric machines, an auxiliary source of electric energy, disconnectable electric conduit means connecting said auxiliary source to said first electric conduit means, and regulatable means for operating said motor-dynamo as a motor during starting of the engine, and as a generator during operation of the engine for transmitting energy produced by the engine via said two electric machines to said blower set.

15. A power plant comprising an internal combustion engine, an exhaust gas turbine driven air blower set, conduit means connecting the blower exhaust to the engine intake conduit means connecting the engine exhaust to the turbine intake, dynamo-electric machine means coupled to said set, dynamo-electric machine means coupled to the engine shaft, electric conduit means between said machine means, an auxiliary source of electric energy, disconnectable electric conduit means connecting said auxiliary source to said first dynamo-electric machine means, and regulatable means for operating said second dynamo-electric means as a motor during starting of the engine, and as a generator during operation of the engine for transmitting energy produced by the engine via said two dynamo-electric machine means to said blower set.

16. A power plant as set forth in claim 15, wherein means is provided for regulating the energy flow during operating of the engine from the second dynamo-electric machine means working as a generator to the first dynamo-electric machine means working as a motor, irrespective of the operating condition of the engine.

17. A power plant as set forth in claim 15, wherein means is provided for regulating the energy flow between the second dynamo-electric machine means working as a generator during operation of the engine and the first dynamo-electric machine means working as a motor, in such manner that the air pressure at the blower outlet is kept higher than the exhaust gas pressure in front of said turbine, irrespective of the operating condition of the engine.

18. A power plant comprising an internal combustion engine, an exhaust gas turbine driven air blower set, conduit means connecting the blower exhaust to the engine air intake, conduit means connecting the engine exhaust to the turbine intake, a fuel burning combustion chamber disposed in said second conduit means, regulatable branch conduit means connecting said first conduit means to said combustion chamber, dynamo-electric machine means coupled to said blower set, dynamo-electric machine means coupled to the engine shaft, electrical conduit means between said dynamo-electric machine means, an auxiliary source of electric energy, disconnectable electrical conduit means connecting said auxiliary source to said first electrical conduit means, means for operating said first dynamo-electric machine means as a motor for starting said blower set from said auxiliary power source, and for operating it as a generator, mechanically driven from said blower set, when the latter operates as a power producing gas turbine unit, and means for regulatably operating said second dynamo-electric machine means as a motor, during starting of the engine, receiving energy from said first dynamo-electric machine means while driven from said set, and for reversing the energy flow between said two dynamo-electric machine means, while the engine is operating, for transmitting energy produced by the engine via said two dynamo-electric machine means to said blower set.

19. A power plant as set forth in claim 18, wherein variable resistance regulating means is provided for the second dynamo-electric machine means for controlling the degree of supercharge of the engine independent of the operating condition of the engine.

20. A power plant as set forth in claim 18, wherein means is provided for regulating the reversed energy flow between the two dynamo-electric machine means, while the engine is operating, in such manner that the air pressure at the blower outlet is kept higher than the exhaust gas pressure in front of said turbine, irrespective of the operating condition of the engine.

*21. In a method of starting and operating a power plant comprising an internal combustion engine having an exhaust gas turbine driven blower set for supplying combustion air to said engine, said set being mechanically independent of the engine shaft, motor-dynamo means mechanically coupled to said set, motor-dynamo means mechanically coupled to the engine shaft, disconnectable electric conduit means between said motor-dynamo means, a fuel burning combustion chamber disposed in the exhaust gas conduit to said turbine, and a regulatable branch conduit connecting the pressure side of said blower to said combustion chamber: those steps comprising operating the combustion chamber and the gas turbine driven blower set as an independent gas turbine plant prior to starting the engine, operating said second motor-dynamo means as motor for cranking and starting said engine and, thereafter, operating it as a generator driven by said engine, for supplying power to said first motor-dynamo means for assisting said gas turbine in driving said blower for supercharging of the engine.*

*22. In a method of starting and operating a power plant comprising an internal combustion engine having an exhaust gas turbine driven blower set for supplying combustion air to said engine, said set being mechanically independent of the engine shaft, motor-dynamo means mechanically coupled to said set, motor-dynamo means mechanically coupled to the engine shaft, disconnectable electric conduit means between said motor-dynamo means, a fuel burning combustion chamber disposed in the exhaust gas conduit to said turbine, and a regulatable branch conduit connecting the pressure side of said blower to said combustion chamber: those steps comprising operating the combustion chamber and the gas turbine driven blower set as an independent gas turbine plant prior to starting the engine, cranking and starting said engine, and, thereafter, operating said second motor-dynamo means as a generator driven by said engine, for supplying power to said first motor-dynamo means for assisting said gas turbine in driving said blower for super-charging of the engine.*

*23. In a method of starting and operating a power plant comprising an internal combustion engine having an exhaust gas turbine driven blower set for supplying combustion air to said engine, said set being mechanically independent of the engine shaft, motor-dynamo means mechanically coupled to said set, motor-dynamo means mechanically coupled to the engine shaft, disconnectable electric conduit means between said motor-dynamo means, a fuel burning combustion chamber disposed in the exhaust gas conduit to said turbine, and a regulatable branch conduit connecting the pressure side of said blower to said combustion chamber: those steps comprising energizing the first motor-dynamo means to start the gas turbine driven blower set, operating the combustion chamber and the gas turbine driven blower set as an independent gas turbine plant prior to starting the engine, cranking and starting said engine and, thereafter, operating said second motor-dynamo means as a generator driven by said engine, for supplying power to said first motor-dynamo means for assisting said gas turbine in driving said blower for supercharging of the engine.*

*24. A power plant comprising an internal combustion engine, an exhaust gas turbine driven air blower set, conduit means connecting the blower exhaust to the engine intake, conduit means connecting the engine exhaust to the turbine intake, a fuel burning combustion chamber disposed in said second conduit means, regulatable branch conduit means connecting said first conduit means to said combustion chamber for enabling the combustion chamber and the gas turbine driven air blower set to operate as an independent gas turbine plant prior to starting the engine, dynamo-electric machine means coupled to said set, dynamo-electric machine means coupled to the engine shaft, electric conduit means between said machine means, an auxiliary source of electric energy, disconnectable electric conduit means connecting said auxiliary source to said first dynamo-electric machine means, for starting the set prior to starting the engine, and regulatable means for operating said second dynamo-electric means as a motor during starting of the engine, and as a generator during operation of the engine for transmitting energy produced by the engine via said two dynamo-electric machine means to said blower set.*

*25. A power plant comprising an internal combustion engine, an exhaust gas turbine driven air blower set, conduit means connecting the blower exhaust to the engine intake, conduit means connecting the engine exhaust to the turbine intake, a fuel burning combustion chamber disposed in said second conduit means, regulatable branch conduit means connecting said first conduit means to said combustion chamber for enabling the combustion chamber and the gas turbine driven air blower set to operate as an independent gas turbine plant prior to starting the engine, motor-dynamo means coupled to said set, motor-dynamo means coupled to the engine shaft, and disconnectable electric conduit means between said motor-dynamo means for enabling the second motor-dynamo means operating as a generator driven by said engine to supply power to said first motor-dynamo means for assisting said gas turbine in driving said blower for super-charging of the engine.*

*26. A power plant comprising an internal combustion engine, an exhaust gas turbine driven air blower set, conduit means connecting the blower*

*exhaust to the engine intake, conduit means connecting the engine exhaust to the turbine intake, a fuel burning combustion chamber disposed in said second conduit means, regulatable branch conduit means connecting said first conduit means to said combustion chamber for enabling the combustion chamber and the gas turbine driven air blower set to operate as an independent gas turbine plant prior to starting the engine, motor-dynamo means coupled to said set, motor-dynamo means coupled to the engine shaft, disconnectable electric conduit means between said motor-dynamo means for enabling the second motor-dynamo means operating as a generator driven by said engine to supply power to said first motor-dynamo means for assisting said gas turbine in driving said blower for super-charging of the engine, and means to crank said engine for starting.*

*27. A power plant comprising an internal combustion engine, an exhaust gas turbine driven air blower set, conduit means connecting the blower exhaust to the engine intake, conduit means connecting the engine exhaust to the turbine intake, a fuel burning combustion chamber disposed in said second conduit means, regulatable branch conduit means connecting said first conduit means to said combustion chamber for enabling the combustion chamber and the gas turbine driven air blower set to operate as an independent gas turbine plant prior to starting the engine, dynamo-electric machine means coupled to said set, dynamo-electric machine means*

*coupled to the engine shaft, electric conduit means between said machine means, an auxiliary source of electric energy, disconnectable electric conduit means connecting said auxiliary source to said first dynamo-electric machine means, for starting the set prior to starting the engine and means to crank said engine for starting.*

FREDERICK NETTEL.

REFERENCES CITED

The following references are of record in the file of this patent or the original patent:

UNITED STATES PATENTS

| Number | Name | Date |
|---|---|---|
| 1,102,455 | Sundh | July 7, 1914 |
| 1,117,378 | Heany | Nov. 7, 1914 |
| 1,339,258 | Delano | May 4, 1920 |
| 1,396,287 | Rotter | Nov. 8, 1921 |
| 1,409,736 | Lea | Mar. 14, 1922 |
| 1,585,831 | Bradford | May 25, 1930 |
| 1,752,224 | Apple | Mar. 25, 1930 |
| 1,978,837 | Forsling | Oct. 30, 1934 |
| 2,070,615 | Plante | Feb. 16, 1937 |
| 2,263,705 | Seippel | Nov. 25, 1941 |
| 2,376,143 | Edwards et al. | May 15, 1945 |
| 2,412,970 | Crary | Dec. 24, 1946 |
| 2,443,648 | Austin et al. | June 22, 1948 |

FOREIGN PATENTS

| Number | Country | Date |
|---|---|---|
| 513,971 | Great Britain | Oct. 26, 1939 |
| 537,483 | Great Britain | June 24, 1941 |